Dec. 30, 1952  G. F. WALES  2,623,419
PRECISION DRILLING MACHINE
Filed Oct. 4, 1946  8 Sheets-Sheet 1

INVENTOR
George F. Wales

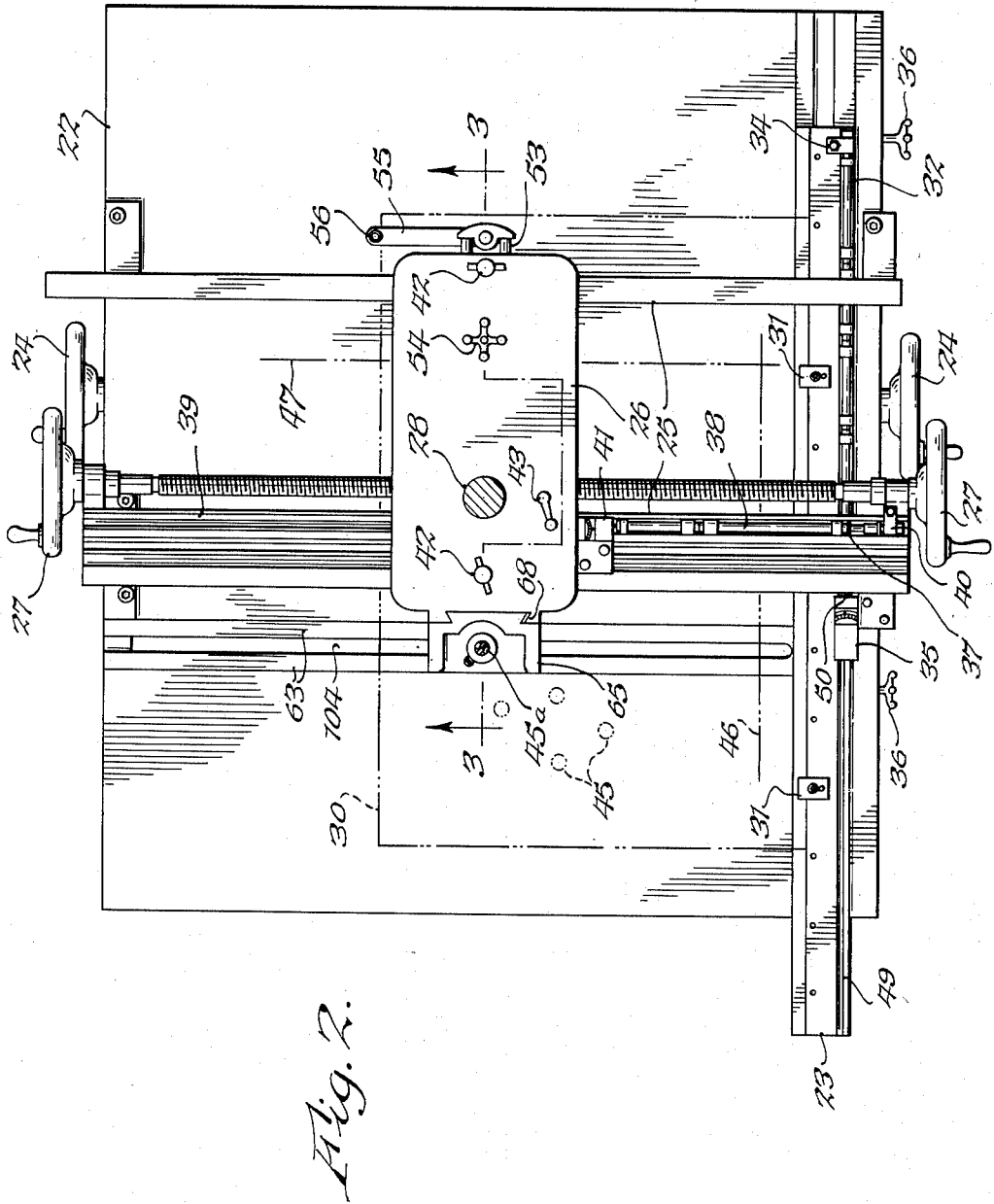

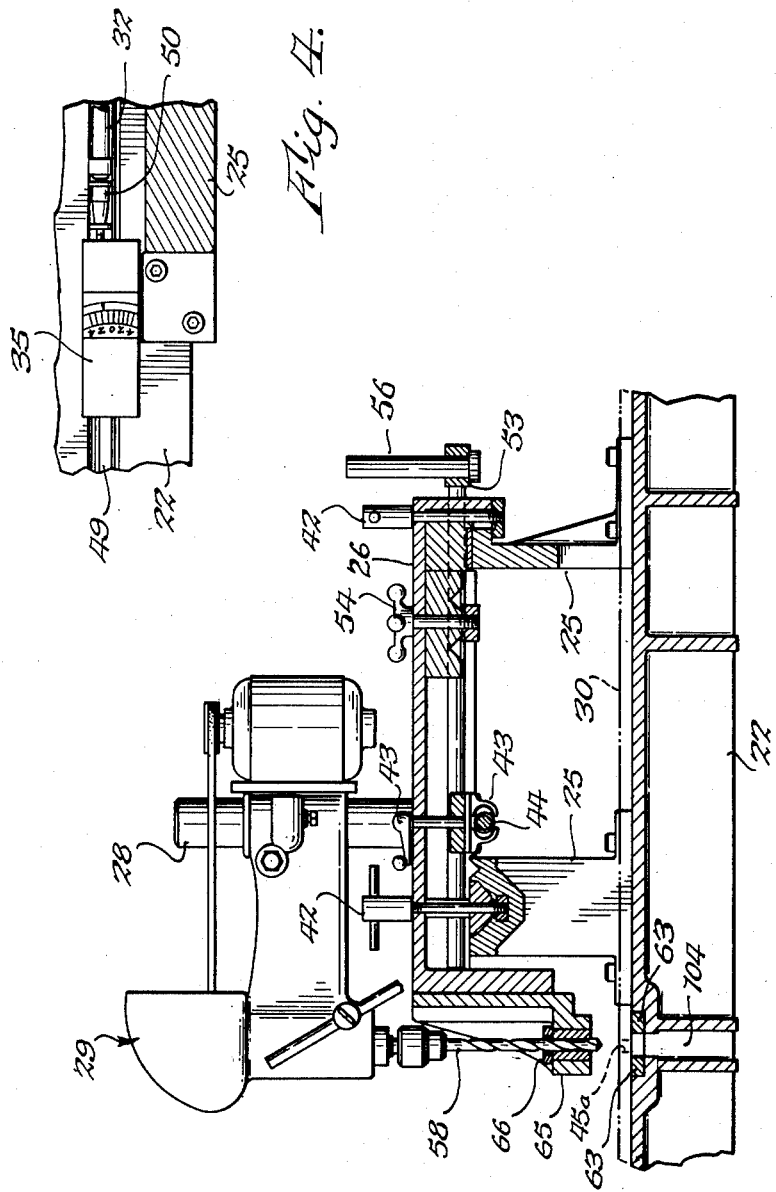

Dec. 30, 1952          G. F. WALES          2,623,419
PRECISION DRILLING MACHINE
Filed Oct. 4, 1946          8 Sheets-Sheet 4
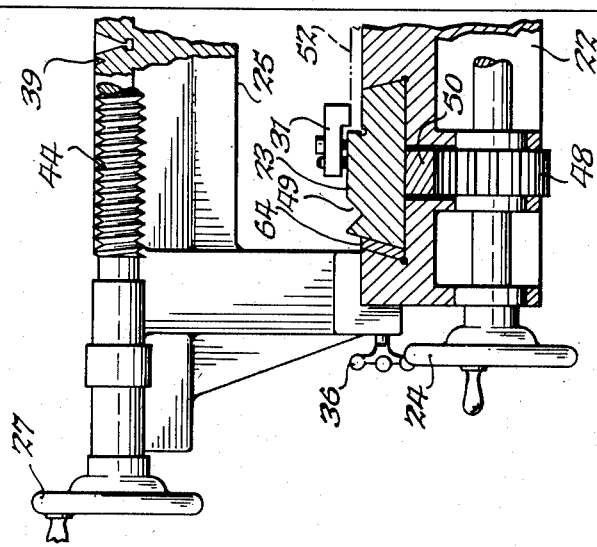
INVENTOR
George F. Wales Dec. 30, 1952            G. F. WALES            2,623,419

PRECISION DRILLING MACHINE

Filed Oct. 4, 1946            8 Sheets-Sheet 5

INVENTOR

George F. Wales

Dec. 30, 1952            G. F. WALES            2,623,419
PRECISION DRILLING MACHINE
Filed Oct. 4, 1946                                  8 Sheets-Sheet 6
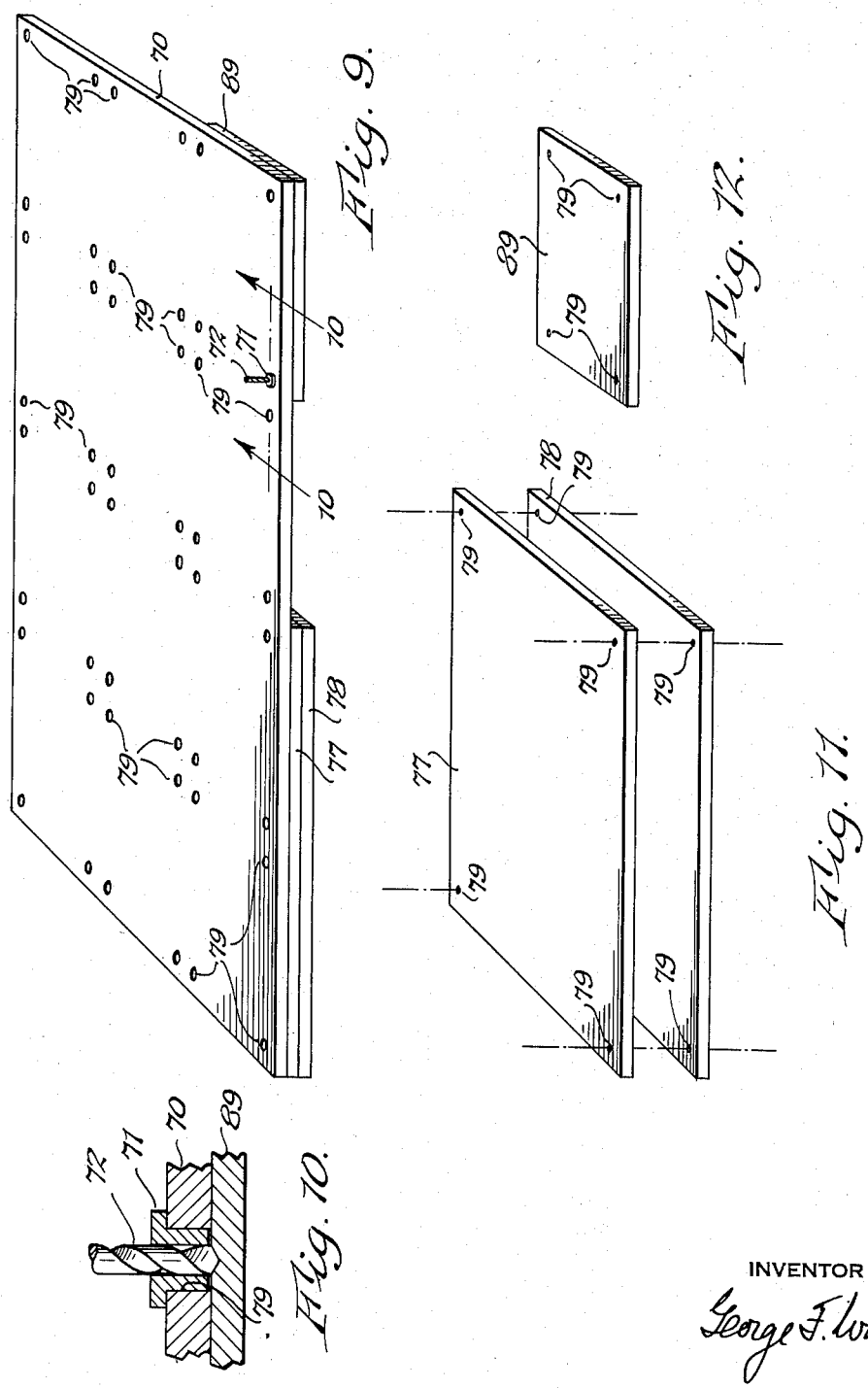
INVENTOR
George F. Wales

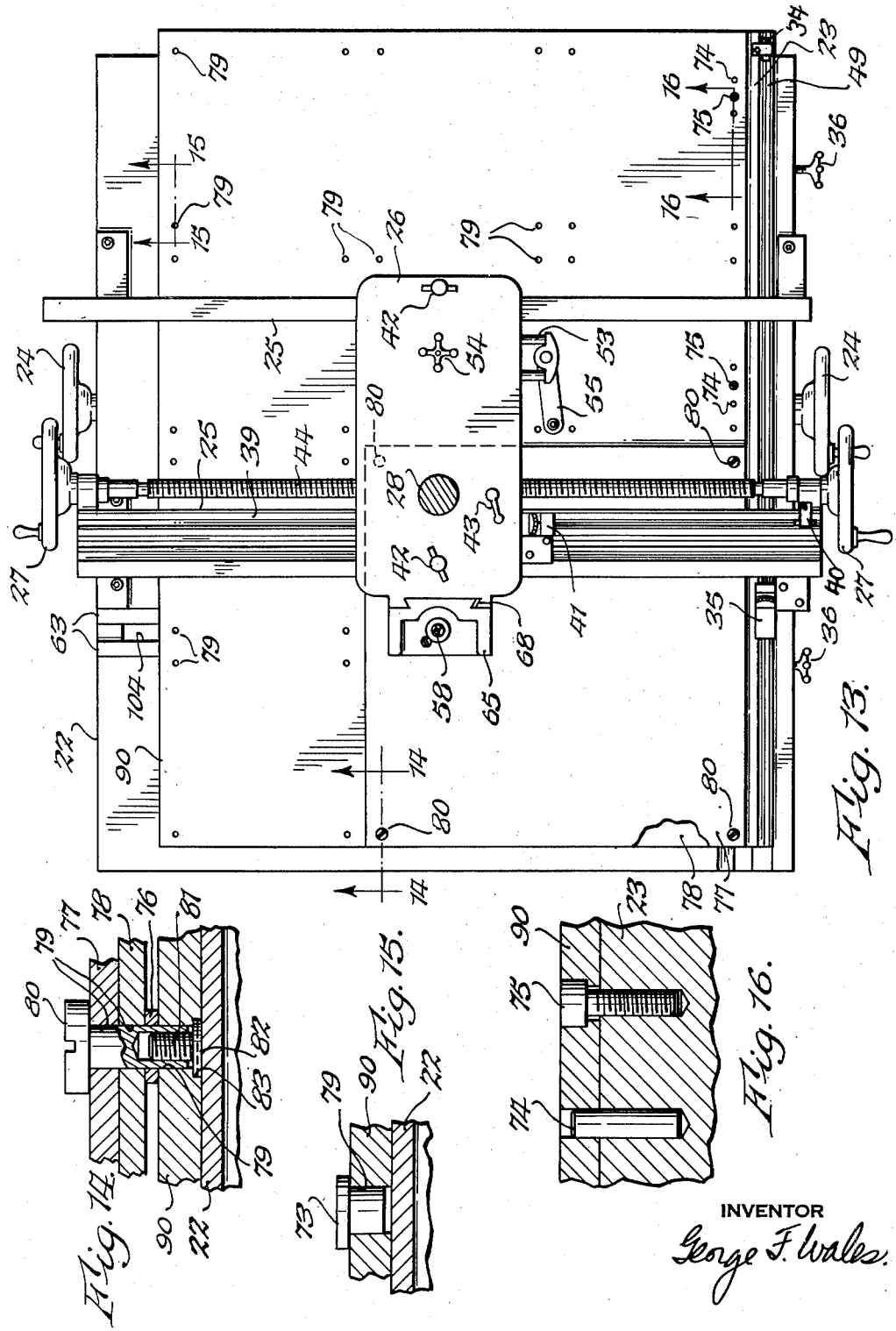

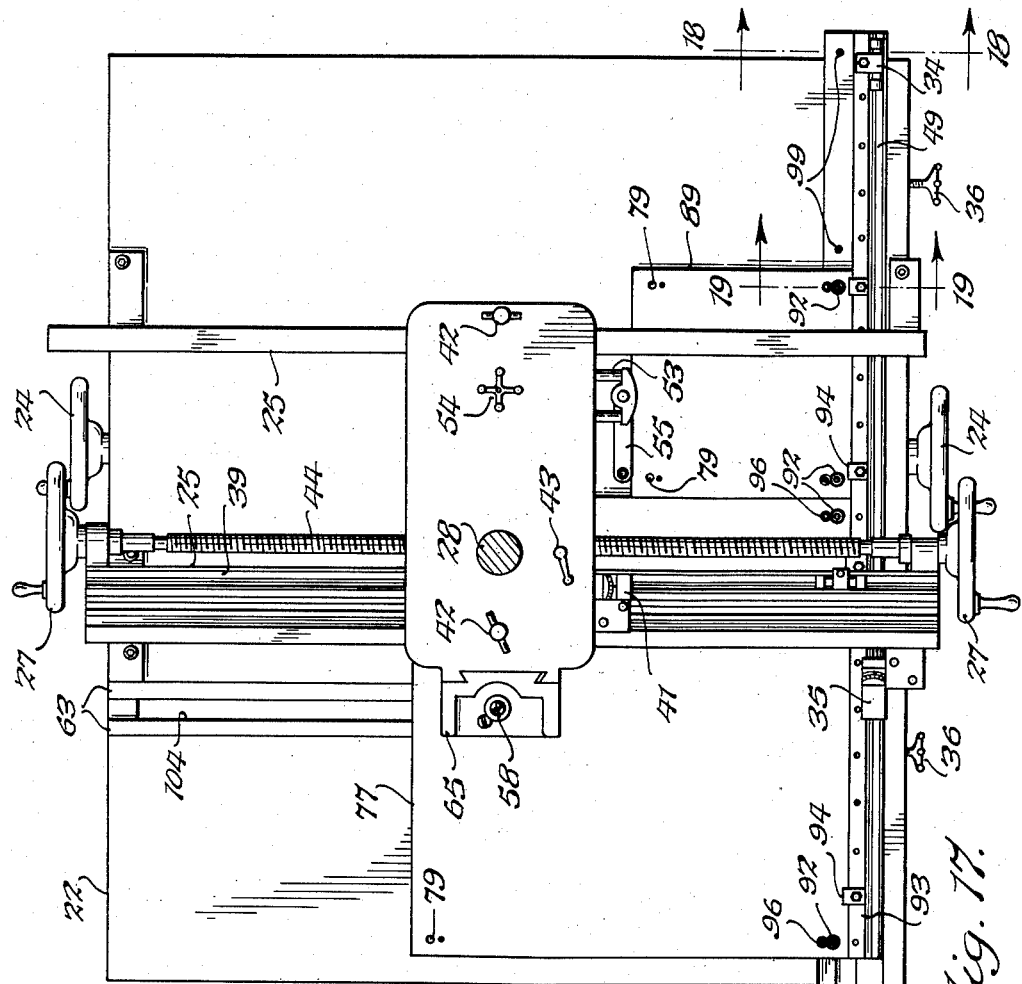

Patented Dec. 30, 1952

2,623,419

UNITED STATES PATENT OFFICE 2,623,419

PRECISION DRILLING MACHINE

George F. Wales, Kenmore, N. Y.

Application October 4, 1946, Serial No. 701,161

11 Claims. (Cl. 77—5)

This invention relates to methods of boring holes in members accurately both as to size and spacing in relation to one another and more particularly to the apparatus used in the methods.

In the metal working industries, jigs, fixtures, templates, machine parts and sheet metal dies are utilized which embody pluralities of holes accurately spaced from one another or reference locations thereon. The reproduction of these holes in tooling components constitutes the major portion of the costs of fabrication.

In general, these tools are fashioned by skilled craftsmen, who first lay out the desired pattern of holes and contour, by geometric means, and then form the pattern in the tooling components by careful precise steps. This procedure was followed by large and small tool fabricators alike until recently when the advent of precision drilling machines, generally known as jig borers, made it possible to reduce the time consumed in the geometrical layout and drilling of the holes where the co-ordinates of hole location were known or determined. However, the complex accurate mechanism employed in the machines heretofore known, made their costs too high for procurement by the smaller manufacturer. In addition, since these machines are incapable of reproducing holes, from all of the diverse data employed in industry for locating holes, they are of little use to the small manufacturer or to the specialized central tooling sources catering to the needs of a plurality of smaller manufacturers. For instance, if the manufacture has a drawing layout, sample part or a suitable template, it is necessary to resolve the dimensional data thereon into the co-ordinates of the hole location, prior to setting up the present jig boring machines, which in many instances, requires as much or more time than geometrical layout of the holes and increases the possibility of error.

The present machines are also inadequate for use in conjuntion with the standardized tooling systems shown in my Patent No. 2,275,706, and Kirsch Patent No. 2,381,062. In these standardized tooling systems, pairs of punches and dies are mounted on plates which are in turn, mounted in aligned relationship to the punch and die holders of a die set. Of primary importance, in these systems, is the accurate spacing of the implement mounting holes from the surfaces or dowel holes utilized for aligning the mounting plates to the die set. Since it is considered desirable to form the locating surfaces or dowel holes from a master jig, so that all mounting plates of a system will be uniform, it is necessary that the implement holes be formed in the plates in a separate operation. This arrangement is also desirable from an operating standpoint as a quantity of pre-drilled mounting plates of various sizes can then be stocked locally or centrally and rapidly prepared when needed merely by drilling the punch and die implement alignment holes in accurate spaced relationship to the mounting surfaces or dowel holes. However, to drill the matching implement holes in a pair of mounting plates, with the present jig borers, it is necessary to laboriously align each mounting plate to the machine to assure that the spacing between the implement mounting holes and the locating surfaces or dowel holes is accurately held. This procedure requires considerable time and reduces the substantial savings to be realized from these systems as well as increasing the possibility of error.

The main object of this invention is to provide an economical flexible drilling machine for accurately reproducing spaced drilled holes by any of the reproduction methods employed in precision work.

An important object of this invention is to provide improved means for forming holes primarily in flat plates used in conjunction with the mounting of punch and die elements in sheet metal working tools.

Another important object of this invention is to provide economical methods of preparing punch and die carrying plates embodying a standard mounting hole pattern.

Yet another important object of this invention is to provide a drilling machine adapted to receive mounting plates previously drilled or prepared in accordance with the mounting arrangement of a standardized tooling system.

Yet another object is to provide a versatile precision drilling machine which is also suitable for the smaller manufacturer.

A companion object is to provide a precision drilling machine which can be easily operated by semi-skilled help.

A further object is to provide a drilling machine adapted to the rapid reproduction of accurate templates.

Fig. 2 is a plan view, taken as noted in Fig. 1 and illustrating the preferred method of locating a hole by utilizing end measures equivalent to the hole co-ordinates from base lines.

Fig. 3 is a sectional view of the drilling machine, taken as noted in Fig. 2 and showing the drill carriage and its mounting details.

Fig. 4 is an enlarged view of the deviation indicator utilized in conjunction with the positioning of the work carriage taken as noted in Fig. 1.

Fig. 5 is a view, similar to Fig. 2, but illustrating the method of locating holes from a scribed template.

Fig. 6 is a sectional view, taken as noted in Fig. 5, which illustrates the organization of the work carriage actuating means, work-piece clamping means and the drill carriage lead screw, journalled on the bridge.

Fig. 9 is a perspective view of a master drill jig utilized for drilling a standardized mounting hole pattern in mounting plates for punch and die implements.

Fig. 10 is a sectional view, taken as noted in Fig. 9 and illustrating the method of drilling mounting plates from the drill jig.

Fig. 11 is a perspective view showing a pair of spaced apart mounting plates drilled from the master drill jig.

Fig. 12 is a view, similar to Fig. 11 illustrating a single, smaller mounting plate.

Fig. 13 is another plan view of the machine similar to Figs. 2, 5 and 7 but illustrating the application of a standardized mounting base plate to the work carriage, said plate having dowel apertures at spaced increments therein and the pair of mounting plates of Fig. 11 engaged in aligned relationship to the mounting base plate by means of spaced dowels.

Fig. 14 is a sectional view, taken as noted in Fig. 13 to illustrate the relative position of the mounting plates and base plate and the engagement of the alignment dowels therewith.

Fig. 15 is a sectional view, taken as noted in Fig. 13 and illustrating the method of plugging the unused holes in the mounting base plate with a headed plug which is also adapted to support the pair of spaced mounting plates while drilling said plates.

Fig. 16 is a sectional view, taken as noted in Fig. 13 which illustrates one of the dowelled attachments of the mounting base plate to the work carriage.

Fig. 17 is another plan view of the machine, similar to Figs. 2, 5, 7 and 13 but illustrating an alternate method of aligning the mounting plates to the work carriage of the drilling machine.

Fig. 18 is a sectional view, taken as noted in Fig. 17, and illustrating one of the retractable dowels on the work carriage and the adjustable stop in its V groove.

Fig. 19 is a similar view illustrating the alignment of a mounting plate to the work carriage by means of one of the retractable dowels and a suitable drill bushing and showing the clamping means for the adjustable stop in the V groove.

Figure 1:
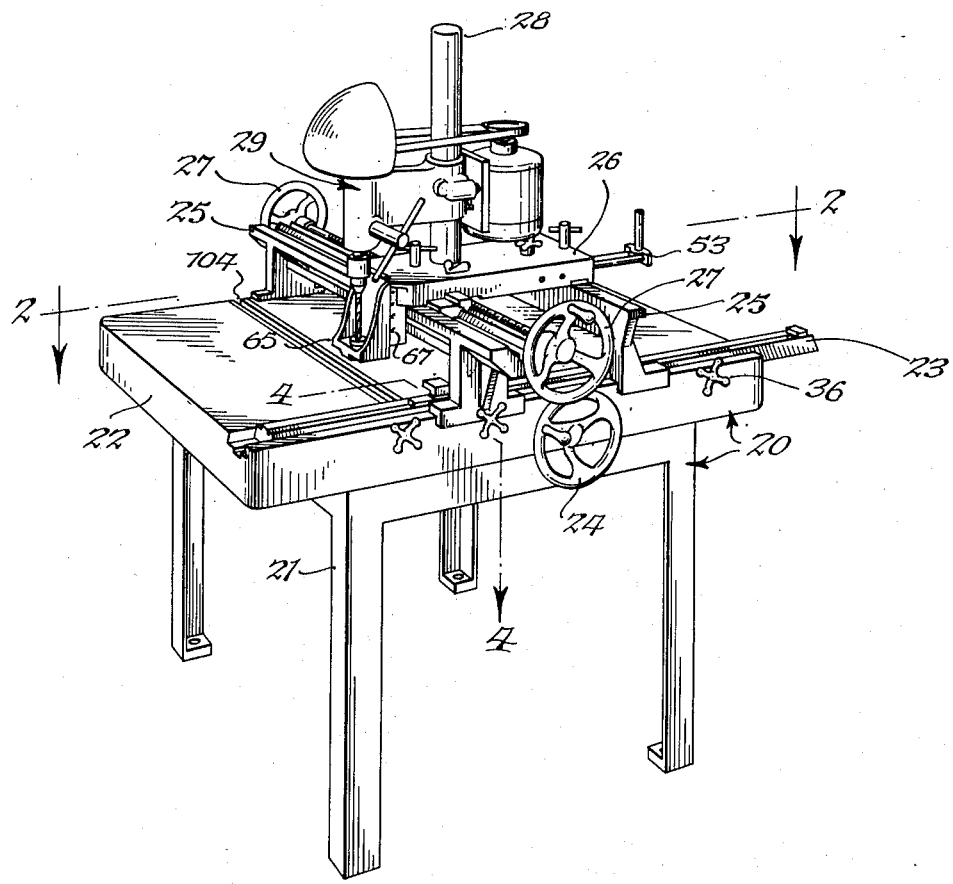
Fig. 1 is a perspective view of the drilling machine.

Referring to Figs. 1, 2, 3 and 6 of the drawings, the basic drilling machine assembly 20 consists of the table base 21, the table 22 thereon, having the work carriage 23, slidably adjustable therein, and the bridge member 25, on table 22, on which the drill carriage assembly 26 is slidably adjustable in a direction transverse of said work carriage in the table 22. Control wheels 24 on table 22, adjust the work carriage 23 through the spur gear 49 and rack 50 shown in Fig. 6 and control wheels 27, on bridge 25 adjust the drill carriage assembly 26 when it is engaged to lead screw 44 by the half nut assembly 43 shown in section in Fig. 3. Locking clamp assemblies 42 rigidly clamp drill carriage assembly 26 to bridge 25 after positioning the carriage and releasing half nut assembly 43 as is illustrated in section in Fig. 3. Work carriage 23 is similarly locked by hand screws 36 of table 22 bearing against gib 64 shown in Fig. 6. Drill head and motor assembly 29 is vertically adjustable on post 28 of carriage 26, and drill guide 65 is vertically adjustable to accommodate different thickness of material. Screws 67 adjust gib 68 to lock guide 65 in place and bushings 66 are readily removable for various drill sizes.

In Fig. 2 a phantom work-piece 30 is shown in which it is desired to locate a pattern of holes 45 knowing the co-ordinates of each hole location from chosen fixed base lines 46 and 47. To position any hole 45a, with respect to these base lines 46 and 47, the work-piece 30 is clamped in place, as shown in Fig. 6 and the base lines are established on the machine by adjusting and clamping stop 40 (Fig. 2) to the V 39 so that stop 40 corresponds to the base line 46 and then repeating the procedure with stop 34 in the V 49 of work carriage 23, as shown in detail in Figs. 18 and 19, with respect to base line 47. Suitable end measures 32 with a suitably adjusted micrometer 50 are chosen which provide a dimension equal to the abscissa of the hole location and are then inserted between stop 34 and the deviation indicator 35 shown in enlarged detail in Fig. 4. By adjusting carriage 23 and its clamped work-piece 30, by means of wheel 24, until the indicator 35 reads 0, the work-piece 30 will be properly positioned with respect to the abscissa of hole location. Hand screws 36 are then actuated to clamp carriage 23 rigidly against movement. To locate the drill carriage 26 with respect to the ordinate of the hole from base line 46, the procedure is repeated, using end measures 38 and suitably adjusted micrometer 37 to provide a dimension equal to the ordinate of the hole 45a which are then placed between stop 40 and deviation indicator 41. Carriage 26 is then adjusted, by means of control wheel 27, until indicator 41 reads 0. Half nut assembly 43 is then disengaged from lead screw 44 and clamps 42 actuated to retain carriage 26 in rigid alignment as is shown in Fig. 3. Hole 45a can thus be drilled and the procedure repeated for the entire hole pattern 45. As will be noted, the hard sharpened wear strips 63 on the edge of the drill clearance slot 104, will remove any burr on the template 30, at the holes 45, when the heavy template is actuated by work carriage 23.

Referring now to Figs. 5 and 6, the method of drilling a work-piece 51 from a scribed template 52 is illustrated. In this method work-piece 51 and template 52 are clamped to carriage 23 in suitably spaced relationship. Sighting support 53 on drill carriage 26 is slidably adjusted by releasing clamp assembly 54 shown also in Fig. 3. Arm 55 on support 53 is radially adjusted until sight 56 is located over cross hairs 57a of the pattern 57, with drill 58 suitably positioned for drilling hole 57a of hole pattern 57 in the work. Arm 55 and support 53 are then clamped rigidly. Carriage 26 and 23 are then adjusted and locked with sight 56 over each cross hair 57 and the corresponding hole of pattern 57 is drilled in the work. A sample part or drilled template can be substituted for template 52 with equal facility.

Figure 7:
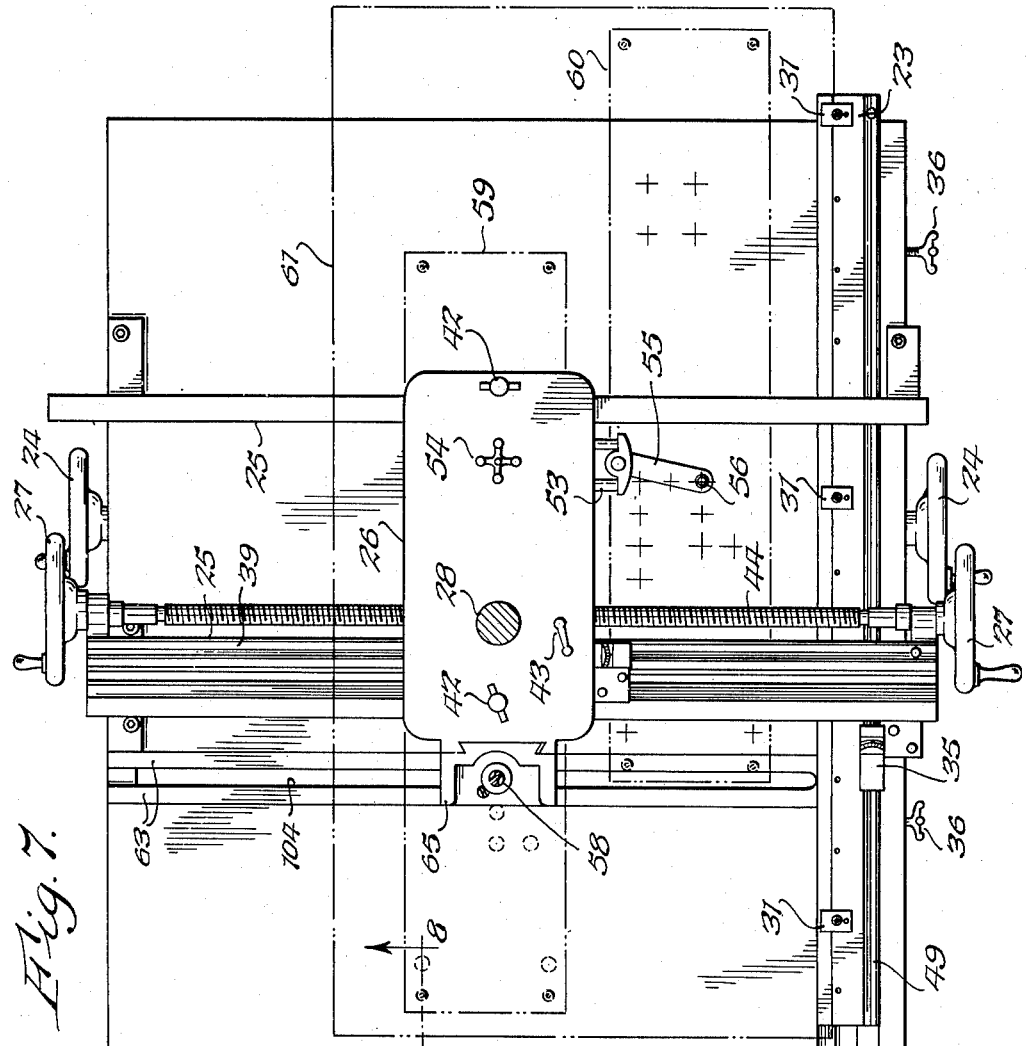
Fig. 7 is a plan view, similar to Figs. 2 and 5 but illustrating the method of drilling a work-piece from a long narrow scribed template mounted to a base plate.
Figure 8:
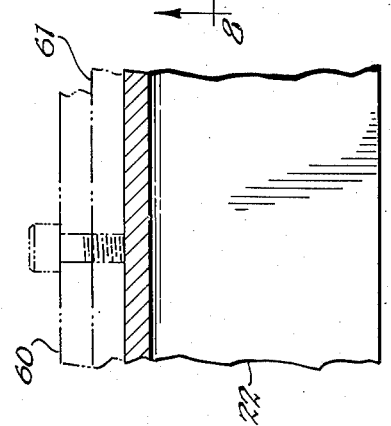
Fig. 8 is a sectional view of this template mounting, taken as noted in Fig. 7.

Reference is now made to Figs. 7 and 8 for the manner of drilling a long narrow work-piece 59 from a scribed similar template 60. Work-piece 59 and template 60 are rigidly bolted to a base plate 61 which in turn, is clamped to work carriage 23. It will be noted that for convenience sighting support 53, radial arm 55 and sight 56 have been inserted in carriage 26 in a position normal to the former locations shown in Fig. 5 and again clamped rigidly by clamp 54. The method of drilling holes in work-piece 59 from the template 60 is identical to that employed previously except that drill head assembly 29, drill guide 65 and sight 56 are adjusted to a higher level to accommodate the greater thickness due to the mounting arrangement.

It is now desirable to consider the methods of preparing the hole pattern in punch and die mounting plates used in conjunction with standardized tooling systems of the character shown in my Patent No. 2,275,706, and patent to Kirsch No. 2,381,062, as well as their application to this machine. Reference is first made to Fig. 9 which illustrates a master drill jig 70 having a standardized hole pattern 79 therein. The mounting plate pair consisting of identical mounting plates 77 and 78 are placed in aligned relation below master drill jig 70. To speed up preparing these plates additional plates such as the individual mounting plate 89 may also be drilled concurrently from the master drill jig 70 as is shown in Fig. 10. Since the concentric drill bushing 71 guides drill 72 in aligned relation to the hole pattern 79 of drill jig 70, the mounting plates 77, 78 and 89 will have a segment of the pattern 79 formed therein, as is shown in Figs. 11 and 12.

A plurality of shapes and sizes of mounting plates having the standardized mounting hole pattern 79 formed therein are preferably made in quantity and stored for withdrawal as required. When a tooling order is received, suitable mounting plates are withdrawn from stock for forming the implement holes therein in accordance with the desired requirements and prepared on this drilling machine in the manner that is detailed in Figs. 13, 14, 15 and 16. In Fig. 13 a mounting base plate 90 having the standardized hole pattern 79 formed therein is suitably dowelled 74 and fastened 75 to work carriage 23 as detailed in Fig. 16, and stops 34 and 49 on the machine are adjusted to base lines equivalent to two of the hole axes in pattern 79. Loose spacer plugs 73 are then inserted in holes 79 as shown in Fig. 15 to serve as spacers and prevent chips entering the unused holes in pattern 79 of mounting base plate 90. Any standardized punch and die mounting plate or a pair thereof can then be fastened to standard mounting base plate 90 by adjusting work carriage 23 until two suitable holes of pattern 79 overhang the table 22. Plugs 73 are then removed from the desired holes of patern 79 and spacer washers 76 placed coaxially over the hole. The previously drilled standardized punch and die mounting plates 77 and 78 are then placed as is shown in Fig. 14 and dowel nuts 80 are inserted through hole 79 in mounting plate 77, hole 79 of mounting plate 78, spacer washer 76 and holes 79 of mounting base member 90. The flat head screws 81 are then used to secure the templates 77 and 78 in juxtaposed relationship to each other and aligned relationship to base plate 90. The heads 82 of screws 81 are flush within the counterbore 83 of holes 79 in base plate 90, any of the previously described drilling methods or combination thereof, used in conjunction with this machine, may be then utilized for drilling the aligned implement holes in mounting plates 77 and 78. The spaced relation of juxtaposed mounting plates 77 and 78, from base plate 90 serves to prevent damage to base plate 90 as drill head 29 can be adjusted to stop drill 58 after the hole is completed in mounting plate 78. Spacer plugs 73 are discarded if they are severely damaged by the drill 58.

While the method of preparing punch and die mounting plates discussed above is preferred, if warranted, punch and die mounting plates can be prepared entirely on the drilling machine by first forming one hole 79 in a mounting plate 77 in approximate location and fastening the mounting plate 77 to the base plate 90 in approximate position with the one hole accurately aligned to the base plate 90. The drill 58 can then be positioned to form a second mounting hole 79 by any of the previously discussed methods which is then used to accurately align the mounting plate 77 to base plate 90 and the procedure is repeated for all the mounting holes 79.

As it is sometimes desired to have the machine adaptable to receiving standardized mounting plates and/or other tooling work, an alternate arrangement is provided as shown in Figs. 17, 18 and 19. This arrangement consists of the regular drilling machine with a modified work carriage 93. Carriage 93 has a row of apertures 99 formed therein which are identically spaced to one row of the standardized hole pattern 79. In each of these apertures 99, a retractable dowel 91 is threadedly engaged as shown in Fig. 18 in retracted position. When required, the dowels can be extended as detailed in Fig. 19 and utilized to align standardized mounting plates such as plates 77 and 89 therewith by means of the concentric bushing 92 and its retainer screw 96. Clamp 94 and screw 95 serve to fasten mounting plates 77 and 89 to work carriage 93. Mounting plates 77 and 89 are shown in Fig. 17 as positioned for drilling the implement holes therein according to any of the previously discussed methods. If desired, the dowels can be retracted and other work can be attached to the work carriage for utilizing the previously discussed drilling methods or a base plate 90 could be attached therewith for handling a plurality of mounting plates such as 89.

It is now obvious to those skilled in the arts, that a very versatile precision drilling machine is herein described, which is adapted to any drilling or boring operation utilized in conjunction with the existent tooling methods or the new methods provided by the operation of this machine and the noted standardized tooling systems.

In the above specification, I have described some modifications of my invention but it will be understood that further alterations could be made without departing from the spirit and scope of invention defined by the following claims.

I claim as my invention:

1. A precision drilling machine comprising a table having a plane top that is recessed adjacent one longitudinal edge of the table to form a guide channel which extends longitudinally of the table, a narrow bar mounted in said guide channel and slidable longitudinally therein, said bar having a longitudinally-extending seating surface along one edge thereof to receive the marginal edge of a workpiece, said seating surface being coplanar with the top of said table, means for releasably securing a workpiece at a marginal edge to said bar so that the workpiece overhangs the seating surface of said bar and rests on the plane top of the table, means for adjusting said bar in said guide channel to move the workpiece longitudinally over the table, a bridge member extending over and spanning the width of said table, a carriage slidable on said bridge member of said table and at right angles to the direction of adjustment of said bar, and a drill head for supporting a drill slidably mounted on said carriage for adjustment toward and from said table in a direction at right angles to the directions of movement of both said bar and said carriage.

2. A precision drilling machine comprising a table having a plane top that is recessed adjacent one longitudinal edge of the table to form a guide channel which extends longitudinally of the table, a narrow bar mounted in said guide channel and slidable longitudinally therein, said bar having a longitudinally-extending seating surface along one edge thereof to receive the marginal edge of a workpiece, said seating surface being coplanar with the top of said table, means for releasably securing a workpiece at a marginal edge to said bar so that the workpiece overhangs the seating surface of said bar and rests on the plane top of the table, means for adjusting said bar in said guide channel to move the workpiece longitudinally over the table, a bridge member extending over and spanning the width of said table, a carriage slidable on said bridge member transversely of said table and at right angles to the direction of adjustment of said bar, a drill head for supporting a drill slidably mounted on said carriage for adjustment toward and from said table in a direction at right angles to the directions of movement of both said bar and said carriage, a stop and an indicator, one of the two last-named parts being mounted on said bar and the other being secured to said table, a second stop and a second indicator, one of the two last-named parts being mounted on said carriage and the other being connected to said bridge, said stops and the associated indicators being adapted to have measuring devices interposed therebetween for precisely positioning the bar and carriage, respectively.

3. A precision drilling machine comprising a table having a plane top that is recessed adjacent one longitudinal edge of the table to form a guide channel which extends longitudinally of the table, a narrow bar mounted in said guide channel and slidable longitudinally therein, said bar having a longitudinally-extending seating surface along one edge thereof to receive the marginal edge of a workpiece, said seating surface being coplanar with the top of said table, means for releasably securing a workpiece at a marginal edge to said bar so that the workpiece overhangs the seating surface of said bar and rests on the plane top of the table, means for adjusting said bar in said guide channel to move the workpiece longitudinally over the table, a bridge member extending over and spanning the width of said table, a carriage slidable on said bridge member transversely of said table and at right angles to the direction of adjustment of said bar, a drill head for supporting a drill slidably mounted on said carriage for adjustment toward and from said table in a direction at right angles to the directions of movement of both said bar and said carriage, a stop and an indicator, one of the two last-named parts being mounted on said bar and the other being secured to said table, a second stop and a second indicator, one of the two last-named parts being mounted on said carriage and the other being connected to said bridge, said stops and the associated indicators being adapted to have measuring devices interposed therebetween for precisely positioning the bar and carriage respectively, the top of said table being recessed to provide a tool clearance groove that extends transversely across the table at right angles to said guide channel and parallel to the direction of movement of said carriage and directly beneath a drill supported in said drill head, and a pair of parallel hard sharpened strips mounted at opposite sides of said groove and bounding said groove, the tops of said strips being coplanar with the top of said table, and said strip serving to remove drill-burrs from a workpiece as it is moved over said table.

4. A precision drilling machine comprising a table having a plane top, a slide reciprocable on said table longitudinally thereof, means for removably securing a workpiece to said slide to overhang said slide and to rest on said table, a carriage, means for supporting said carriage above said table to be movable transversely of said table at right angles to the direction of movement of said slide, a drill head for supporting a drill slidably mounted on said carriage for adjustment toward and from said table in a direction at right angles to the directions of movement of both said slide and said carriage, the top of said table being recessed to provide a tool clearance groove that extends transversely across the table at right angles to the direction of movement of said slide and parallel to the direction of movement of said carriage and directly beneath a drill supported in said drill head, said groove being bounded by parallel cutting edges which serve to remove drill burrs from the workpiece as it is moved across said table.

5. A precision drilling machine comprising a table having a plane top that is recessed adjacent one longitudinal edge of the table to form a guide channel which extends longitudinally of the table, a narrow bar mounted in said guide channel and slidable longitudinally therein, said bar having a longitudinally-extending seating surface along one edge thereof to receive the marginal edge of a workpiece, said seating surface being coplanar with the top of said table, means for releasably securing a workpiece at a marginal edge thereof to said bar so that the workpiece overhangs the seating surface of said bar and rests on the plane top of the table, means for adjusting said bar in said guide channel to move the workpiece longitudinally over the table, a bridge member extending over and spanning the width of said table, a carriage slidable on said bridge member transversely of said table and at right angles to the direction of adjustment of said bar, a drill head for supporting a drill slidably mounted on said carriage for adjustment toward and from said table in a direction at right angles to the directions of movement of both said bar and said carriage, a stop and an indicator, one of the two last-named parts being secured to said bar and the other of said two last-named parts being secured to said table, said bar having a longitudinally-extending V-shaped groove therein parallel to said guide channel and adapted to receive measuring devices interposed between said stop and said indicator to position the bar precisely on the table, a second stop and an indicator, one of the two last-named parts being secured to said bridge member and the other of the two last-named parts being secured to said carriage, said bridge member having a V-shaped groove therein extending parallel to the direction of movement of said carriage and adapted to receive measuring devices interposed between said second stop and said second indicator to position the carriage precisely on the bridge member.

6. A precision drilling machine comprising a table having a plane top that is recessed adjacent one longitudinal edge of the table to form a guide channel which extends longitudinally of the table, a narrow bar mounted in said guide channel and slidable longitudinally therein, said bar having a longitudinally-extending seating surface along one edge thereof to receive the marginal edge of a workpiece, said seating surface being coplanar with the top of said table, means for releasably securing a workpiece at a marginal edge thereof to said bar so that the workpiece overhangs the seating surface of said bar and rests on the plane top of the table, means for adjusting said bar in said guide channel to move the workpiece longitudinally over the table, a bridge member extending over and spanning the width of said table, a carriage slidable on said bridge member transversely of said table and at right angles to the direction of adjustment of said bar, a drill head for supporting a drill slidably mounted on said carriage for adjustment toward and from said table in a direction at right angles to the directions of movement of both said bar and said carriage, means for adjusting said carriage on said bridge member, means for locking said bar to said table in any adjusted position, and means for locking said carriage to said bridge member in any adjusted position.

7. A precision drilling machine comprising a table having a plane top that is recessed adjacent one longitudinal edge of the table to form a guide channel which extends longitudinally of the table, a narrow bar mounted in said guide channel and slidable longitudinally therein, said bar having a longitudinally-extending seating surface along one edge thereof to receive the marginal edge of a workpiece, said seating surface being coplanar with the top of said table, means for releasably securing a workpiece at a marginal edge thereof to said bar so that the workpiece overhangs the seating surface of said bar and rests on the plane top of the table, means for adjusting said bar in said guide channel to move the workpiece longitudinally over the table, a bridge member extending over and spanning the width of said table, a carriage slidable on said bridge member transversely of said table and at right angles to the direction of adjustment of said bar, a drill head for supporting a drill slidably mounted on said carriage for adjustment toward and from said table in a direction at right angles to the directions of movement of both said bar and said carriage, a stop and an indicator, one of the two last-named parts being secured to said bar and the other of said two last-named parts being secured to said table, said bar having a longitudinally-extending V-shaped groove therein parallel to said guide channel and adapted to receive measuring devices interposed between said stop and said indicator to position the bar precisely on the table, a second stop and an indicator, one of the two last-named parts being secured to said bridge member and the other of the two last-named parts being secured to said carriage, said bridge member having a V-shaped groove therein extending parallel to the direction of movement of said carriage and adapted to receive measuring devices interposed between said second stop and said second indicator to position the carriage precisely on the bridge member, the top of said table being recessed transversely at right angles to said guide channel and parallel to the direction of movement of said carriage and directly beneath a drill mounted on said drill head to provide a transversely extending tool clearance channel, and two parallel, hard, sharpened strips secured in said tool clearance channel to bound the sides thereof, said strips having their tops coplanar with the top of said table and serving to remove drill burrs from a workpiece as the workpiece is moved across the top of the table by adjustment of said bar.

8. A precision drilling machine, comprising a table having a horizontal, plane-surfaced top that is recessed adjacent one longitudinal edge of the table to form a guide channel which extends longitudinally of the table, a narrow bar mounted in said guide channel and slidable longitudinally therein, said bar having a longitudinally-extending, horizontal seating surface along one edge thereof to receive the marginal edge of a workpiece, said seating surface being coplanar with the top of said table, means for releasably securing a workpiece at a marginal edge thereof to said bar so that the workpiece overhangs the seating surface of said bar and rests on the plane top of said table, means for adjusting said bar in said guide channel to move the workpiece longitudinally over the table, a bridge member extending over and spanning the width of said table, said bridge member being formed on its top with a guide surface that extends transversely of said table, a carriage mounted on top of said bridge member to slide longitudinally on said guide surface and at right angles to the direction of movement of said bar, a post secured to said carriage to project upwardly therefrom, a drill head for supporting a drill slidably mounted on said post for vertical adjustment toward and from said table in a direction at right angles to the directions of movement of both said bar and said carriage, means for adjusting the carriage on the bridge member, means for precisely determining the positions of both the bar on the table and of the carriage on the bridge member, and means for locking both the bar and the carriage in adjusted positions.

9. A precision drilling machine, comprising a table having a horizontal, plane-surfaced top that is recessed adjacent one longitudinal edge of the table to form a guide channel which extends longitudinally of the table, a narrow bar mounted in said guide channel and slidable longitudinally therein, said bar having a longitudinally-extending, horizontal seating surface along one edge thereof to receive the marginal edge of a workpiece, said seating surface being coplanar with the top of said table, means for releasably securing a workpiece at a marginal edge thereof to said bar so that the workpiece overhangs the seating surface of said bar and rests on the plane top of said table, means for adjusting said bar in said guide channel to move the workpiece longitudinally over the table, a bridge member extending over and spanning the width of said table, said bridge member being formed on its top with a guide surface that extends transversely of said table, a carriage mounted on top of said bridge member to slide horizontally on said guide surface and at right angles to the direction of movement of said bar, a post secured to said carriage to project upwardly therefrom, a drill head for supporting a drill slidably mounted on said post for vertical adjustment toward and from said table in a direction at right angles to the directions of movement of both said bar and said carriage, means for adjusting the carriage on the bridge member, means secured to said carriage for precisely determining the positions of both the bar on the table and of the carriage on the bridge member, and means for locking both the bar and the carriage in adjusted positions.

10. A precision drilling machine, comprising a table having a horizontal plane-surfaced top that is recessed adjacent one longitudinal edge of the table to form a guide channel which extends longitudinally of the table, a narrow bar mounted in said guide channel and slidable longitudinally therein, said bar having a longitudinally-extending, horizontal seating surface along one edge thereof to receive the marginal edge of a workpiece, said seating surface being coplanar with the top of said table, means for releasably securing a workpiece at a marginal edge thereof to said bar so that the workpiece overhangs the seating surface of said bar and rests on the plane top of said table, means for adjusting said bar in said guide channel to move the workpiece longitudinally over the table, a bridge member extending over and spanning the width of said table, said bridge member being formed on its top with a guide surface that extends transversely of said table, a carriage mounted on top of said bridge member to slide horizontally on said guide surface and at right angles to the direction of movement of said bar, a post secured to said carriage to project upwardly therefrom, a drill head for supporting a drill slidably mounted in said post for vertical adjustment toward and from said table in a direction at right angles to the directions of movement of both said bar and said carriage, means for adjusting the carriage on the bridge member, means for precisely determining the positions of both the bar on the table and of the carriage on the bridge member, and means for locking both the bar and the carriage in adjusted positions, the top of said table being recessed to provide a tool clearance groove that extends transversely across the table at right angles to said guide channel and parallel to the direction of movement of said carriage and directly beneath a drill supported in said drill head, and a pair of parallel, hard, sharpened strips mounted at opposite sides of said groove and bounding said groove, said strips serving to remove drill-burrs from a workpiece as it is moved over said table.

11. A precision drilling machine, comprising a table having a horizontal, plane-surfaced top that is recessed adjacent one longitudinal edge of the table to form a guide channel which extends longitudinally of the table, a narrow bar mounted in said guide channel and slidable longitudinally therein, said bar having a longitudinally-extending, horizontal seating surface along one edge thereof to receive the marginal edge of a workpiece, said seating surface being coplanar with the top of said table, means for releasably securing a workpiece at a marginal edge thereof to said bar so that the workpiece overhangs the seating surface of said bar and rests on the plane top of said table, means for adjusting said bar in said guide channel to move the workpiece longitudinally over the table, a bridge member extending over and spanning the width of said table, said bridge member being formed on its top with a guide surface that extends transversely of said table, a carriage mounted on top of said bridge member to slide horizontally on said guide surface and at right angles to the direction of movement of said bar, a post secured to said carriage to project upwardly therefrom, a drill head for supporting a drill slidably mounted on said post for vertical adjustment toward and from said table in a direction at right angles to the directions of movement of both said bar and said carriage, means for adjusting the carriage on the bridge member, means secured to said carriage for precisely determining the positions of both the bar on the table and of the carriage on the bridge member, and means for locking both the bar and the carriage in adjusted positions, the top of said table being recessed to provide a tool clearance groove that extends transversely across the table at right angles to said guide channel and parallel to the direction of movement of said carriage and directly beneath a drill supported in said drill head, and a pair of parallel, hard, sharpened strips mounted at opposite sides of said groove and bounding said groove, said strips serving to remove drill-burrs from a workpiece as it is moved over said table.

GEORGE F. WALES.

REFERENCES CITED

The following references are of record in the file of this patent:

UNITED STATES PATENTS

| Number | Name | Date |
|---|---|---|
| Re. 21,795 | Verderber | May 6, 1941 |
| 447,014 | Pryibil | Feb. 24, 1891 |
| 1,217,572 | Craley | Feb. 27, 1917 |
| 1,442,538 | Pearn | Jan. 16, 1923 |
| 1,570,928 | Thomas | Jan. 26, 1926 |
| 2,213,566 | Mair et al. | Sept. 3, 1940 |
| 2,268,293 | Lundeberg | Dec. 30, 1941 |